(12) United States Patent
Jiang et al.

(10) Patent No.: US 6,326,762 B1
(45) Date of Patent: Dec. 4, 2001

(54) METHOD OF BRAKING A VECTOR CONTROLLED INDUCTION MACHINE, CONTROL DEVICE FOR CARRYING OUT THE METHOD AND STORAGE MEDIUM

(75) Inventors: Jinsheng Jiang, Nürnberg; Joachim Holtz, Wuppertal, both of (DE)

(73) Assignee: Weg Automacão Ltda, Jaraguá do Sul (BR)

( * ) Notice: Subject to any disclaimer, the term of this patent is extended or adjusted under 35 U.S.C. 154(b) by 0 days.

(21) Appl. No.: 09/641,533

(22) Filed: Aug. 18, 2000

(30) Foreign Application Priority Data

Aug. 18, 1999 (EP) .................................................. 99116121

(51) Int. Cl.$^7$ .................................................. H02P 21/00
(52) U.S. Cl. ........................ 318/811; 318/799; 318/805; 318/807
(58) Field of Search ..................... 318/799–812, 318/720, 701, 798, 759, 375, 370, 757; 180/65.1, 65.6; 363/34, 37, 41, 36, 35

(56) References Cited

U.S. PATENT DOCUMENTS

| | | | |
|---|---|---|---|
| 4,672,288 | * | 6/1987 | Abbondanti . |
| 5,549,172 | * | 8/1996 | Mutoh et al. . |
| 5,585,709 | * | 12/1996 | Jansen et al. . |
| 5,729,113 | * | 3/1998 | Jansen et al. . |
| 5,959,430 | * | 9/1999 | Yuki et al. . |
| 6,005,783 | * | 12/1999 | Xue et al. . |
| 6,014,006 | * | 1/2000 | Stuntz et al. . |
| 6,014,007 | * | 1/2000 | Seibel et al. . |
| 6,242,885 | * | 6/2001 | Ide et al. . |
| 6,262,555 | * | 7/2001 | Hammond et al. . |

FOREIGN PATENT DOCUMENTS 0743745   11/1996   (EP) .

OTHER PUBLICATIONS

Holtz, "Methods for Speed Sensorless Control of AC Drives," IEEE Press Book, 1996, pp. 21–29.
Khambadkone, et al., "Vector–Controlled Induction Motor Drive with a Self–Commissioning Scheme," IEEE Trans. on Industrial Electronics, vol. 38, No. 5, Oct. 1991, pp. 322–327.
Khambadkone, A.M., et al., "Vector–Controlled Induction Motor Drive with a Self–Commissioning Scheme," IEEE Transactions on Industrial Electronics, vol. 38, No. 5, Oct. 1991, pp. 322–327.
Holtz, Joachim, "Methods for Speed Sensorless Control of AC Drives," published in K. Rajashekara (Editor) "Sensorless Control of AC Motors", IEEE Press Book, 1996.

* cited by examiner

*Primary Examiner*—Paul Ip
(74) *Attorney, Agent, or Firm*—David N. Lathrop; Gallagher & Lathrop

(57) ABSTRACT

A method and a control device for braking a variable speed vector controlled induction machine are driven by a pulse width modulation (PWM) inverter, in which the q-current component and the d-current component of the stator current are controlled independently from one another in accordance with a first reference signal ($i_q$*) and a second reference signal ($i_d$*), respectively. For braking, high frequency components are superimposed on the second reference signal ($i_d$*), and the root-mean-square (rms) value ($i_{d\,rms}$) and the average value ($i_{d\,av}$) of the resultant second reference signal are controlled independently from one another such that the field requirements are met by the average value and high machine losses are produced by the rms value.

23 Claims, 7 Drawing Sheets

METHOD OF BRAKING A VECTOR CONTROLLED INDUCTION MACHINE, CONTROL DEVICE FOR CARRYING OUT THE METHOD AND STORAGE MEDIUM

TECHNICAL FIELD

The present invention relates to the so-called vector or field oriented control of induction machines and, more particularly, it relates to a method of braking a vector controlled induction machine. The invention also relates to a control device for carrying out the method and a machine readable storage medium carrying program code for carrying out the method.

BACKGROUND ART

In order to allow the speed of an induction motor to be changed, a polyphase AC supply of variable voltage and variable frequency is required, since induction motors operate at a speed substantially corresponding to the supply frequency and their flux is determined by the supply voltage. As illustrated in FIG. 1 and known from, e.g., *Power Electronics and Variable Frequency Drives*, edited by Bimal K. Bose, IEEE PRESS, 1996, pp. 211, such an AC supply is generally created from a DC source using an electronic DC-to-AC inverter. In the example shown in FIG. 1 the DC source is represented by a DC link capacitor 10 which is in turn fed by a three-phase rectifier 12 from a three-phase AC source not shown. The reference numeral 16 in FIG. 1 denotes the induction machine represented by its stator windings. The DC link capacitor 10 is a relatively large electrolytic capacitor which is inserted to keep the DC-link voltage $u_d$ constant and to provide a path for rapidly changing currents drawn by the inverter 14. It is normally preferred to use a diode bridge as rectifier 12 because of its low cost. However, a diode bridge is not capable of regenerating power to the AC supply. If an AC drive is able to operate in four quadrants, power will be regenerated to the DC link when the induction machine works in generating mode. The reversal of power flow will consequently raise the DC link voltage above its normal operation value, and steps must be taken to absorb this regenerated power to prevent a dangerous increase of the DC link voltage. Typically, a switched resistor (not shown) in parallel with the DC link capacitor 10 is used to absorb this energy. This makes extra power electronics and control electronics necessary, and thus increases the cost of the AC drive, and reduces its reliability.

To avoid using a switched resistor or any other energy dissipating hardware and, thereby, to reduce the cost, it is known to dissipate the regenerated energy in the AC motor and to some extent in the inverter. To facilitate understanding of the principle of such methods, it will be discussed at first which kinds of losses exist in an induction motor and how these losses can be used to dissipate the regenerated energy.

In order to assess the possibilities of dissipating energy in the induction machine, the various losses in the machine are first identified. These losses are illustrated in the power flow diagram of FIG. 2. For a 3-phase machine the input power is given by $$P_{elec} = 3V_1 I_1 \cos\phi \qquad (1)$$

where $V_1$ is the phase voltage, $I_1$ is the phase current, and $\cos\phi$ is the displacement factor.

Losses occur both in the stator and in the rotor. The losses in the stator are:

1. Copper losses $P_{cu,s}$ in the stator windings which are proportional to the square of the stator current $I_s$:

$$P_{cu,s} = 3I_s^2 R_s \qquad (2)$$

where $R_s$ is the ohmic resistance of one phase winding; and

2. Stator core losses $P_{Fe,s}$ which include hysteresis and eddy current losses and depend on the magnitude of the stator flux and the stator frequency $f_s$.

The power that remains after deducting $P_{cu,s}$ and $P_{Fe,s}$ from $P_{elec}$ is the air gap power $P_{ag}$ which crosses the air gap. A portion of it is dissipated as copper loss in the rotor windings and as core loss and in the rotor core, respectively. These losses are:

3. The copper loss in the rotor windings which is proportional to the square of the rotor current $I_r$:

$$P_{cu,r} = 3I_r^2 R_r \qquad (3)$$

where $R_r$ is the ohmic resistance of one phase winding of the rotor; and

4. The rotor core losses $P_{Fe,r}$ which include hysteresis and eddy current losses and depend on the magnitude of the rotor flux and the rotor frequency $f_r$. At normal operating condition, the frequency $f_r$ of the rotor current is low and then these losses can be neglected.

The remaining power is converted into mechanical power. A portion of it is lost as windage and friction losses, which losses depend on the rotor speed. The rest is finally the mechanical output power $P_{shaft}$, which is the useful output power from the machine. It is assumed here for simplicity that the mechanical inertia of the rotor is contained in the mechanically coupled load. The rotor has then zero inertia and the accelerating or decelerating torque are contributed by the shaft power.

To brake an induction motor to reduce its speed, a braking torque is required to counteract the active torque generated by the mechanically coupled load and by the inertia of the drive train. The shaft power $P_{shaft}$ is negative during braking. The power flow is shown in FIG. 3. Depending on the sign of slip s, there are two modes of operation. The generating mode is shown in FIG. 3(a). The slip is negative (s<0), which means that both the stator flux and the rotor rotate in the same direction, and the flux rotates slower than the rotor. As a result, the air gap power $P_{ag}$ is negative. Unless the motor operates at very low speed, the air gap power is larger than the stator losses such that the input power $P_{elec}$ is negative. In this case, all motor losses, and the input power $P_{elec}$ as well, are supplied by the shaft power $P_{shaft}$.

In the plugging mode, the slip is positive (s>1). The stator flux and the rotor rotate in different directions. FIG. 3(b) illustrates this situation. The stator losses are exclusively supplied by the inverter and the rotor losses are supplied both together by the inverter and by the shaft power.

In case of s=1 the stator frequency is zero. This condition characterizes the well known DC braking method.

A negative shaft power $P_{shaft}$ is called braking power in the following. At constant mechanical speed ω, the developed braking torque is proportional to the shaft power $P_{shaft}$. To make the braking torque as high as possible, maximum braking power must be achieved. If there is no energy consumed in the DC link, the braking power can be mostly absorbed in the motor, and to some extent in the inverter. Hence an efficient braking scheme should aim at maximizing the power dissipation in the motor, which maximizes the braking torque.

Considering the example of a 10-kW induction motor, the losses typically subdivide as follows:

TABLE 1

| | |
|---|---|
| stator copper losses | $P_{CUs} = 0.6\ P_{total}$ |
| stator core losses | $P_{Fes} = 0.25\ P_{total}$ |
| rotor copper losses | $P_{CUr} = 0.15\ P_{total}$ |

$P_{total}$ are the total losses of the motor. The rotor core losses can be neglected since the rotor frequency equals the slip frequency and hence is very low. Friction and windage losses are also very small if forced ventilation is assumed.

It can be seen from the example that most of the motor losses occur in the stator. The rotor losses are small in comparison with the stator copper and stator core losses. It should be noted that this observation is generally true for any motor of any power rating.

The aforementioned DC braking is the method currently preferred in the art for braking an induction motor. In this method, the stator flux is first controlled to near zero and then a DC voltage is generated by the inverter to establish maximum DC current flow in the stator windings. Although the stator current has a maximum value in this case, the resulting braking power is very small. The stator flux does not rotate and hence the air gap power is zero. The stator copper losses are maximum, but they do not contribute to the braking power as they are supplied by the inverter. The stator core losses are zero since the stator frequency is zero. The rotor core losses are negligible since the flux is very small. Only the energy dissipated in the rotor resistances is supplied by the shaft power, and hence the braking power is low. Referring to the typical machine losses in Table 1, the rotor copper losses and hence the braking power amount to only 15% of the total machine losses. This means that the capability of the motor to dissipate the braking power is badly exploited.

Apart from the poor ability to develop braking torque, the method of DC braking exhibits also a poor dynamic performance, since the flux can not be abruptly changed. Before the braking torque is developed, a time delay of several times the rotor time constant $\tau_r$ elapses during which the flux decays to the required small amplitude. It takes the same time delay until the original flux is reestablished when returning to normal operation.

High dynamic performance is achieved using the principle of field oriented control (FO control) also known as vector control. Here, the torque producing or quadrature component $i_q$ (simply referred to "q-current" hereinafter) and the magnetizing or in-phase component $i_d$ (simply referred to "d-current" hereinafter) of the stator current are dynamically decoupled. FIG. 4 shows a block diagram illustrating the basic structure of an FO control. 20 in FIG. 4 denotes a speed controller, 22 a flux controller, 24, 26 and 50 adders, 28 a current controller, 32 and 34 coordinate transform elements, 36 a pulsewidth modulator, 38 a speed sensor and 40 a motor model or observer. 10 is an uncontrolled bridge rectifier, 12 is the DC link capacitor, and 14 the inverter. The induction motor is denoted by 16. 80 is a voltage transducer which generates a signal proportional to the DC link voltage $u_d$. The voltage transducer 80 is not part of the known FO control scheme but is used in the present invention as will be explained in detail later.

Since the basic structure and operation of an FO control is well known (see for instance FIG. 3 in A. M. Khambadkone, J. Holtz: "Vector-Controlled Induction Motor Drive with a Self-Commissioning Scheme," *IEEE Trans. on Industrial Electronics*, Vol. 38, No. 5, October 1991, pp. 322–327), a detailed description is omitted here.

The motor enters the generating mode when the speed reference $\omega^*$ is lower than the measured motor speed $\omega$. The field, and consequently the stator core losses, are maintained at nominal values. Since the power regenerated to the DC link is zero, the airgap power equals the stator losses. The q-current and the rotor current are then very small. Their contributions to the copper losses can be neglected. It is only the d-current that produces copper losses in the stator. The d-current is typically 30% of the nominal stator current. Since the copper losses are proportional to the square of the current, the losses at field oriented braking are $$P_{FO}=P_{Fe\ s}+0.3^2 P_{Cu\ s}=(0.25+0.05)P_{total}=0.3 P_{total} \qquad (4)$$

This means that the motor dissipates only 30% of its rated losses at field oriented braking.

To maximize the stator and rotor copper losses, the stator and rotor currents must be maximum. The maximum stator core losses occur when the stator flux is maximum and the stator frequency is high. Moreover, all losses must be supplied by the shaft power, not by the inverter. Finally, high dynamic torque control must be ensured.

DISCLOSURE OF INVENTION

It is an objective of the invention to define a method of braking an induction machine so as to achieve highest power dissipation in the machine and high dynamics at the same time. Another objective of the invention to provide a control device adapted to carry out the method.

According to one aspect of the invention, a method for braking a variable speed vector controlled induction machine driven by a pulse width modulation (PMV inverter, where the q-current component and the d-current component of the stator current are controlled independently from one another in accordance with a first reference signal ($i_q^*$) and a second reference signal ($i_d^*$), respectively, comprises the steps: (a) measuring or estimating actual rotor speed ($\omega$) of the induction machine; (b) obtaining a flux value ($\Psi_r$) representing an estimation of either actual stator flux or actual rotor flux; (c) receiving a braking signal indicating a need for braking torque if the actual rotor speed ($\omega$) is higher than a reference speed ($\omega^*$); (d) superimposing, in response to the braking signal, high frequency components on said second reference signal ($i_d^*$); and (e) controlling the root-mean-square (rms) value ($i_{d\ rms}$) of said second reference signal obtained from step (d) in accordance with a difference between the absolute value of said reference speed ($\omega^*$) and that of the speed obtained in step (a), while (f) controlling the average value ($i_{d\ av}$) of said second reference signal obtained from step (d) independently from step (e) in accordance with a difference between a reference flux ($\psi_r^*$) and the flux value ($\Psi_r$) obtained in step (b).

According to another aspect of the invention, a control device for carrying out a method of braking a variable speed vector controlled induction machine comprises a rectifier having an output; a direct current (DC) link capacitor coupled to the output of said rectifier; a pulse width modulation (PWM) inverter coupled between said DC link capacitor and said induction machine; a controller for said PWM inverter, said controller having a first input terminal for receiving a first reference signal ($i_q^*$) for the q-current component of the stator current, and a second input terminal for receiving a second reference signal ($i_d^*$) for the d-current component of the stator current; a sensor for obtaining a first signal ($\omega$) representing actual rotor speed of the induction machine or an estimation thereof; an observer for obtaining a second signal ($\psi_r$) representing an estimation of either actual stator flux or actual rotor flux of the induction machine; a speed controller for generating said first reference signal ($i_q^*$) in response to a difference between a reference speed ($\omega^*$) and said first signal; a flux controller for generating a third reference signal ($i_{d\ av}$) in response to a difference between a reference flux ($\psi_r^*$) and said second signal ($\psi_r$); a terminal for receiving a braking signal indicating a need for braking torque if the actual rotor speed ($\omega$) is higher than a reference speed ($\omega^*$); a loss controller for generating a fourth reference signal ($i_{d\ rms}$) in response to a difference between the absolute value of said reference speed ($\omega^*$) and that of said first signal ($\omega$), and a signal generator responsive to said braking signal for generating said second reference signal ($i_d^*$) including high frequency components, and having its rms value ($i_{d\ rms}$) controlled in accordance with said fourth reference signal, and its average value ($i_{d\ av}$) independently controlled in accordance with said third reference signal.

According to yet another aspect of the invention, a machine readable medium carries a program of instructions for execution by a device to perform the method recited above for braking a variable speed vector controlled induction machine.

Preferred embodiments of the invention are set forth below and in the claims.

To ensure the required dynamic performance, the present invention is based on and improves the field oriented control. Thus, the method and device according to the invention are applicable to variable speed AC FO control drives and achieve both at the same time: a maximum braking ability and a very high dynamic performance.

Further details, features and advantages of the invention will be explained below with reference to preferred embodiments in conjunction with the accompanying drawings, in which like elements are denoted with like reference signs.

MODES FOR CARRYING OUT THE INVENTION

To ensure the required dynamic performance, the machine is operated at field oriented control. The electromagnetic torque $$T_e = k_r \psi_r i_q \tag{5}$$

is then proportional to the rotor flux linkage $\psi_r$ and the q-current $i_q$. $k_r = l_h/l_r$ is the coupling factor of the rotor, $l_h$ being the mutual inductance between stator and rotor windings and $l_r$ the inductance of the rotor winding. The rotor flux linkage $\psi_r$ is defined by the differential equation $$\tau_r \frac{d\psi_r}{dt} + \psi_r = l_h i_d \tag{6}$$

where $\tau_r = l_r/r_r$ is the rotor time constant. Equations (5) and (6) are visualized in the signal flow graph shown in FIG. 5 (see for instance J. Holtz: "Methods for Speed Sensorless Control of AC Drives," in *Sensorless Control of AC Motors*, edited by K. Rajashekara, IEEE Press Book, 1996).

To maximize the stator copper losses given by equation (2), the root-mean-square (rms) value of the stator current $$I_s = \sqrt{\frac{1}{T} \int_{(T)} (i_d^2 + i_q^2)\, dt} \tag{7}$$

should be maximum. There are, however, constraints on both the d-current $i_d$ and the q-current $i_q$ on the right-hand side of equation (7):

1. The d-current $i_d$ is limited to about 30% of the nominal stator current in the base speed range, and to lower values at field weakening.
2. The q-current $i_q$ determines the torque according to equation (5). Hence $i_q$ is limited to low values in the braking mode since the braking power must not exceed the machine losses which are low as compared with the power rating of the machine.

According to the invention, high-frequency components are superimposed on the d-current $i_d$. This results in rapid changes of the magneto-motoric force (mmf) in the stator, which induce similar changes of the rotor mmf As a consequence, the rms values of the stator current and the rotor current increase, thus increasing the copper losses in the stator and in the rotor. Also the core losses increase due to the high-frequency leakage fields. Varying the magnitude of the injected high-frequency $i_d$-components permits controlling the additional losses. The total machine losses can be made at least as high as the total nominal machine losses $P_{total}$. They can be further increased if the inverter is capable of delivering more than the rated machine current. In addition, the losses of the inverter are supplied by the machine and hence contribute to the braking power.

Figure 5:
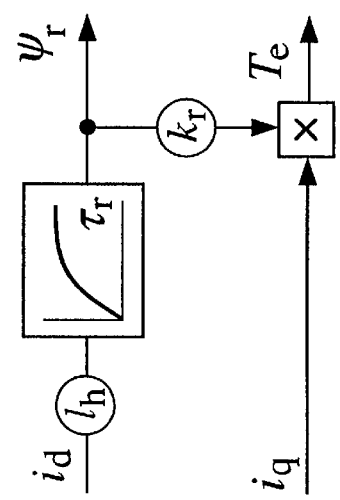
FIG. 5 is a dynamic model of the induction motor.

The injected high-frequency components do not have adverse effects on the machine performance. FIG. 5 shows that the large rotor time constant attenuates the high-frequency $i_d$-current components and hence almost eliminates their influence on the electromagnetic torque.

Figure 6:
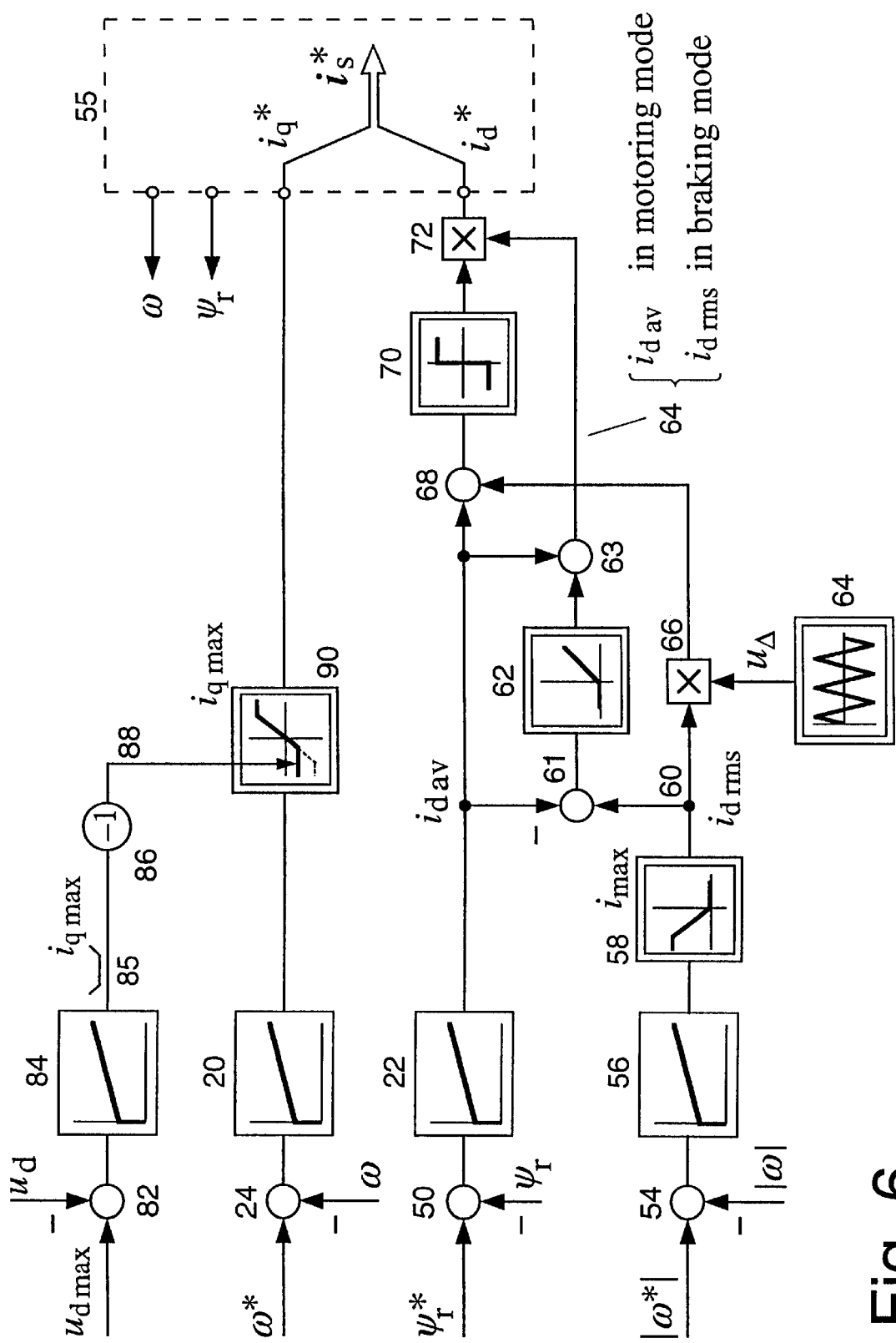
FIG. 6 is a block diagram of a control device according to a preferred embodiment the present invention.

FIG. 6 shows a signal flow diagram of an embodiment of the present invention. In the illustrated control structure the average value $i_{d\ av}$ and the rms value $i_{d\ rms}$ of the d-current $i_d$ are independently controlled. The rotor flux controller 22 determines the average value $i_{d\ av}$ of the d-current reference $i_d^*$. A loss controller 56 is provided to generate the signal $i_{d\ rms}$ which represents the required rms value of $i_d^*$. This signal is obtained as the output of a limiter 58 and can only assume positive values. The output signal of the control structure FIG. 6 is the stator current reference vector $i_s^*$. This reference vector replaces the signal $i_s^*$ in the conventional control scheme FIG. 4 to enable control both in the motoring mode and in the braking mode. The remaining parts of the control device according to this embodiment may be identical to the elements 10, 12, 14, 16, 36 and 55 in FIG. 4 and are not shown, therefore, in FIG. 6.

Positive speed will be assumed throughout this discussion for simplicity. The torque is then positive in the motoring mode, and negative during regeneration and braking. If the motor runs at negative speed, the sign of the torque is negative in the motoring mode, and positive during regeneration and braking. Also the signs of the q-current $i_q$, and of some particular control signals reverse when the speed reverses. Operation at negative speed will not be discussed for simplicity. State-of-the art knowledge permits deriving the respective operating conditions of the braking control scheme if the speed reverses.

Figure 7:
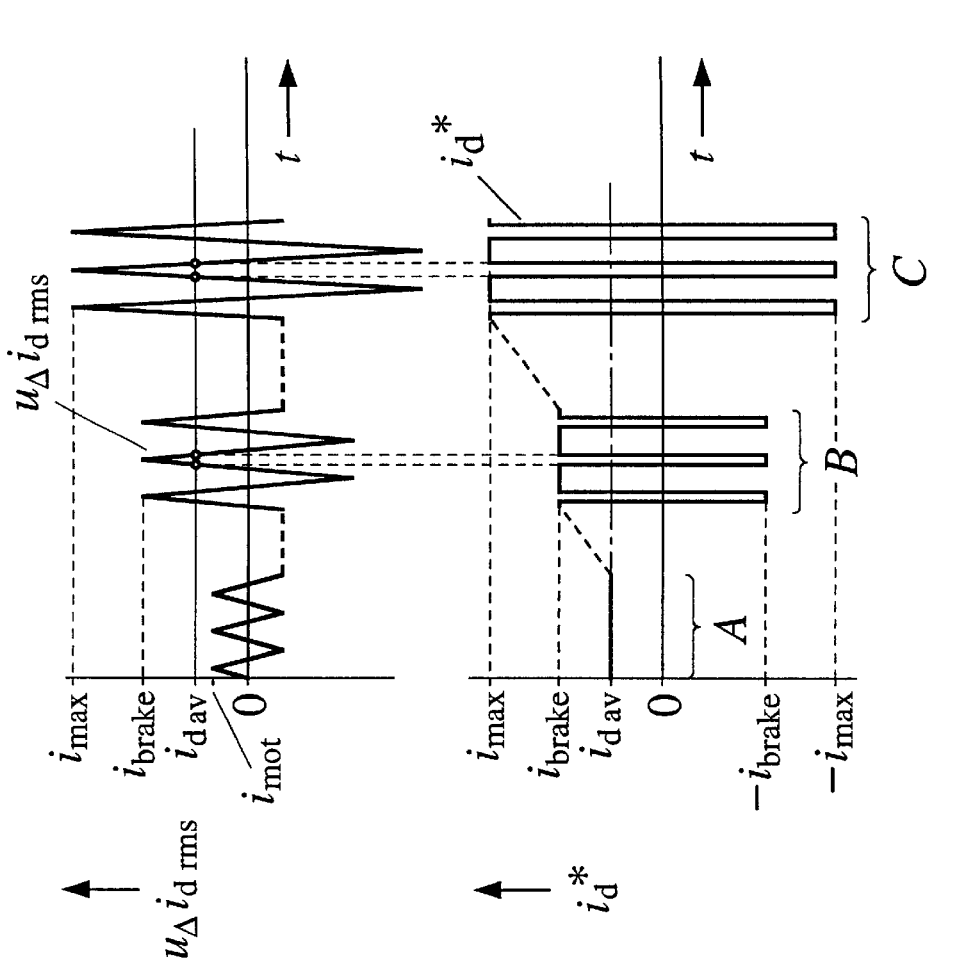
FIG. 7 shows characteristic signals in the motoring mode and the braking mode, respectively.

The motoring mode is considered first. The waveforms shown in the time interval A in FIG. 7 illustrate this operation. The flux controller 22 generates the signal $i_{d\ av}$ which represents the average value of the d-current $i_d$. It will be shown in the following that this signal determines the d-current reference $i_d^*$ in the motoring mode. Owing to the high dynamic performance of the FO control, the signals $|\omega^*|$ and $|\omega|$ in FIG. 6 are almost equal. The signal 60 which originates in the loss controller 56 is then very low and positive, or assumes zero value, as negative values are suppressed by the limiter 58. Limiter 58 has a transfer function $y=f(x)$ of $y=0$ for $x>0$, $y=-x$ for $0 \geqq x > x_{max}$ and $y=x_{max}$ for $x \leqq x_{max}$. The magnitude of signal 60 in the motoring mode is marked as $i_{mot}$ in the upper portion of FIG. 7. Since $i_{mot} < i_{d\ av}$, the difference $i_{mot} - i_{d\ av}$ at the output of adder 61 is negative which makes the output of limiter 62 zero, whose transfer function $y=f(x)$ is: $y=0$ for $x<0$ and $y=x$ for $x>0$.

The oscillator 64 generates a triangular oscillation of unity amplitude. The frequency $f_c$ of this carrier wave is set to $f_c > 1/\tau_r$, where $\tau_r$ is the rotor time constant of the machine. A typical value is $f_c=20$ Hz. The output of multiplier 66 is a triangular wave of amplitude $i_{mot} < i_{d\ av}$. This makes the output of adder 68 positive and the output of comparator 70 unity. The output of multiplier 72 defines the d-current reference $i_d^*$. We have $i_d^* = i_{d\ av}$, since the output of limiter 62 is zero.

The operation in the motoring mode corresponds to normal FO control. The reference value $i_q^*$ of the quadrature current is determined by the speed controller 20 through the limiter 90. Hence, in the FO mode, the q-current reference $i_q^*$ is subjected to the symmetrical bounds $\pm i_{q\ max}$ motoring mode, to avoid overloading the inverter. While the positive $i_q$-current bound $i_{q\ max}$ is constant, the negative bound is variable as commanded by a control signal 88, which is in turn governed by a voltage controller 84 through an inverting element 86 multiplying the output signal of voltage controller 84 with −1. An adder 82 receives at one input terminal a voltage reference $u_{d\ max}$ set to about 1.2 $u_{dR}$, where $u_{dR}$ is the nominal value of the DC link voltage in the motoring mode. A signal representing the DC link voltage $u_d$ is obtained from the voltage transducer 80 in FIG. 4 and applied to a second input terminal of the adder 82 so as to be subtracted from $u_{d\ max}$. The output signal of the adder 82 feeds the voltage controller 84. We have $u_d = u_{dR} < u_{d\ max}$ in the motoring mode. The output signal of the voltage controller 84 turns positive and gets limited to an upper bound $i_{q\ max}$ by a limiter 85. Owing to the inverting element 86, the input signal 88 to the limiter 90 is then $-i_{q\ max}$. Consequently, the q-current reference $i_q^*$ as obtained from the speed controller 20 is limited to $-i_{q\ max}$.

At moderate braking, the required braking power is less than the maximum power dissipation of both the machine and the inverter. Moderate braking is referred to as braking mode I. Control in this mode is explained with reference to the waveforms of time interval B in FIG. 7. A braking torque is required if $|\omega^*| < |\omega|$. Hence $|\omega^*| - |\omega|$ is used as the input to the loss controller 56. This determines the rms value $i_{d\ rms}$ of the d-current which serves to control the copper losses of the machine. As an example, a value $i_{d\ rms}$ that ranges in the moderate braking mode I is denoted as $i_{brake}$ in FIG. 7. The condition $i_{d\ rms} = i_{brake} > i_{d\ av}$, indicates that braking power must be dissipated. In FIG. 6, the amplitude of the carrier signal at the output of multiplier 66 equals $i_{d\ rms}$. Since $i_{d\ rms} > i_{d\ av}$, the adder 68 and the comparator 70 operate now as a pulsewidth modulator. The duty cycle of the modulation is $$d = \frac{1}{2}\left(1 + \frac{i_{d\,av}}{i_{d\,rms}}\right) \tag{8}$$

To achieve independent control of $i_{d\ rms}$ and $i_{d\ av}$, a modulation of the pulse width and the pulse amplitude is required. The modulation is devised such that it controls the rms value of a square wave while maintaining its average value unaffected. To this end, the pulse sequence generated by the adder 68 and the comparator 70 is subsequently scaled in magnitude by the multiplier 72. The scaling factor 64 is determined as follows: The limiter 62 receives a positive input signal and consequently outputs the value $i_{d\ rms} - i_{d\ av}$ through its unity gain characteristic. To this value is the signal $i_{d\ av}$ then added by adder 63, from which the signal $i_{d\ rms}$ results as the scaling factor 64. The resulting reference signal $i_d^*$ during time interval B is a pulsewidth modulated square wave as shown in the lower portion of FIG. 7 in time interval B. The amplitude of this square wave and hence its rms value equals $i_{d\ rms}$. The average value is given by $$\bar{i}_d^* = i_{d\,rms}(2d-1) \tag{9}$$

Inserting the duty cycle from equation (8) into equation (9) yields $\bar{i}_d^* = i_{d\ av}$. Hence the modulated reference waveform $i_d^*(t)$ is controlled to assume the average value $i_{d\ av}$.

In braking mode I, the shaft input power is converted to electrical power which is dissipated both in the machine and in the inverter to balance the required braking power. The machine is operated at nominal field in the base speed range. Operation above base speed requires field weakening to maintain the stator current controllable. This way the field is always held at its maximum possible value so as to maximize the stator core losses. The copper losses in the stator and the rotor are adjusted by the loss controller 56 such that the required braking power gets fully absorbed. The loss controller determines the rms value of the stator currents. However, both the average value $i_{d\ av}$ of the d-current, and the q-current $i_q$, must not be influenced by the loss controller: $i_{d\ av}$ is governed by the flux controller 22 to satisfy the field requirement, while $i_q$ is adjusted by the speed controller 20 to satisfy the torque requirement. While leaving these settings unaffected, the loss controller 56 generates a high-frequency d-current component that determines the required rms value of the stator currents. Although being a component of the d-current, the high-frequency current does not influence the field.

Accordingly, the braking control scheme is devised for an independent adjustment of three different currents: the average d-current $i_{d\ av}$, the rms d-current $i_{d\ rms}$, and the q-current $i_q$. However, an additional constraint exists when the braking power increases such that the current limit of the inverter is reached. This condition defines braking mode II. In this mode, the machine and inverter losses are maximum and the braking power must not be further increased. Hence the losses as commanded by the loss controller 56 must be limited so as to limit the inverter current. This purpose is served by the limiter 58. In braking mode II, the limit value $i_{max}$ determines the amplitude of the pulsewidth modulated square wave $i_d^*$ at the output of multiplier 72. The inverter current is then also limited to about $i_{max}$, since the q-current $i_q$ does not contribute much to the rms stator current in braking mode II. It is small as compared with the maximum current $i_{max}$, and, moreover, it is in quadrature to the square wave current reference $i_d^*$. Hence its contribution to the stator current amplitude is negligible.

The waveform of $i_d^*$ in braking mode II is shown in FIG. 7, time interval C. Although the rms value is larger than that in time interval B (braking mode I), the respective average values of $i_d^*$ in time interval B and in time interval C are adjusted to assume the same value $i_{d\,av}$. It can be observed in FIG. 7 that this is done by adjusting the duty cycle of the pulsewidth modulator.

The aforementioned conditions ensure that both the machine and the inverter produce their maximum losses. The total losses determine the permitted braking power, which is now adjusted through the machine torque, and hence through $i_q^*$. The braking power is regenerated into the DC link. However, the important condition is that the DC link voltage is maintained below its upper limit $u_{d\,max}$.

In braking mode I, the output of the voltage controller 84 is driven towards its positive maximum, and the inverse signal 88 towards its negative maximum. The adjustable bound in the left half-plane of limiter 90 is then maintained at the fixed limit value $-i_{q\,max}$. The reason is that the delivered braking power can be fully absorbed by the system losses and the DC link voltage assumes its nominal value $u_{dR}$. When entering braking mode II, the loss controller output gets limited by limiter 58. Since the system losses cannot increase, the excess of the regenerated braking power accumulates in the DC link capacitor 12. The DC link voltage increases. The voltage controller 84 counteracts as soon as the DC link voltage $u_d$ increases beyond the voltage reference $u_{d\,max}$. The voltage controller output then decreases from its positive value, and the adjustable bound of limiter 90 increases from its negative value. Note that $i_q$ is also negative during braking. Due to the adjustable bound of limiter 90, the q-current reference derived from the speed controller 20 is deactivated, and replaced by the q-current reference from voltage controller 84. The resulting the q-current reference $i_q^*$ is then lower in magnitude which makes the braking torque reduce. The voltage controller adjusts the braking torque such that the voltage error $u_{d\,max}-u_{dR}$ is minimum, thereby limiting the braking power to equal the maximum achievable power dissipation of the system.

It should be noted that the machine field to which the FO control refers can be either the stator field, as described for instance by the stator flux linkage, or the rotor field, described by the rotor flux linkage. As regards the present invention, it is of no significance which of the two alternatives is applied in a particular application, and it is only for simplicity, that reference has been made above only to a control system that uses the principle of rotor field orientation, in which the rotor flux linkage $\psi_r$ determines the q-current component and the d-current component. It has little impact if the stator flux linkage is used instead to determine the respective current components.

Figure 1:
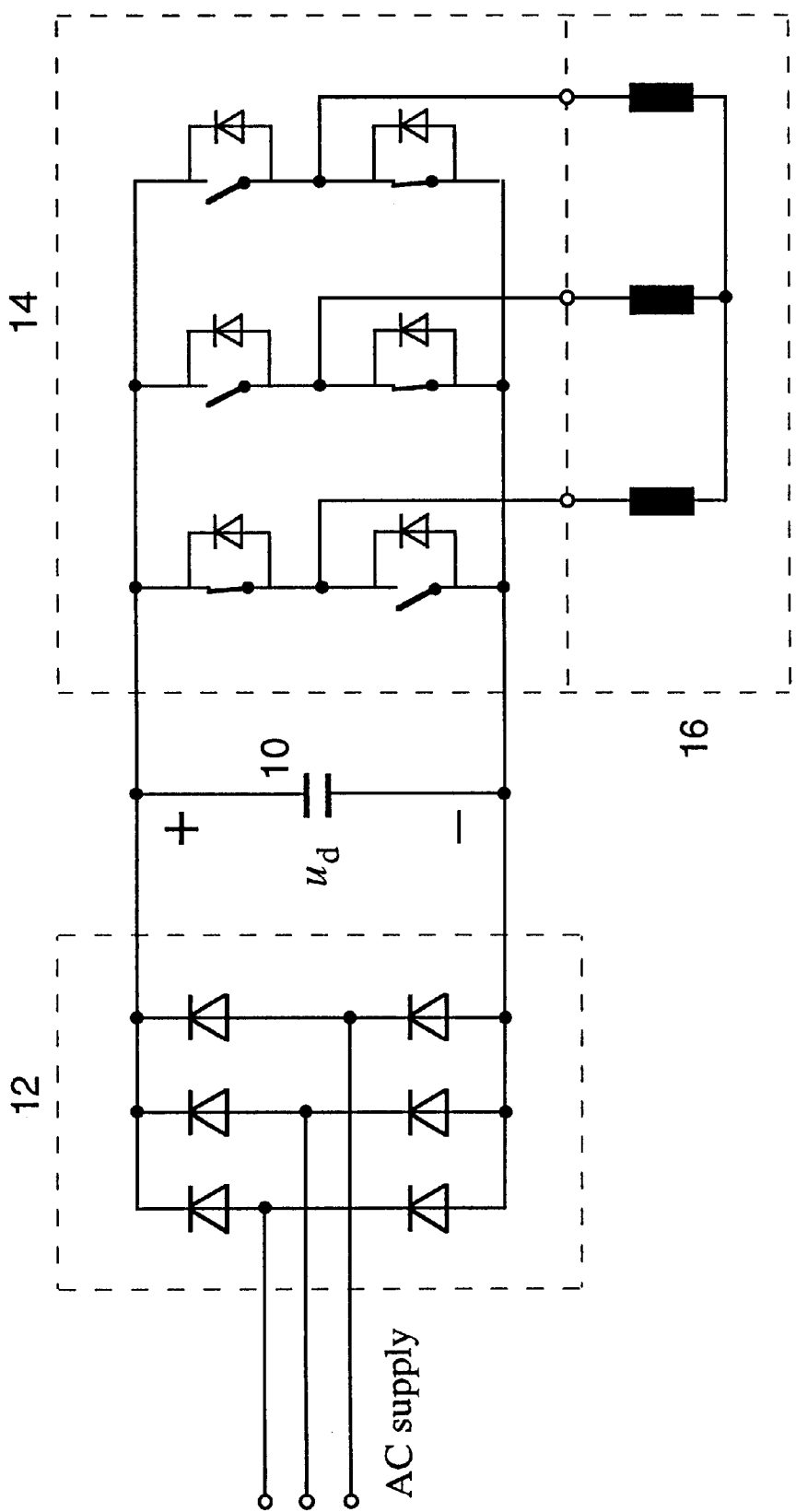
FIG. 1 is a schematic diagram of a variable speed AC drive.
Figure 2:
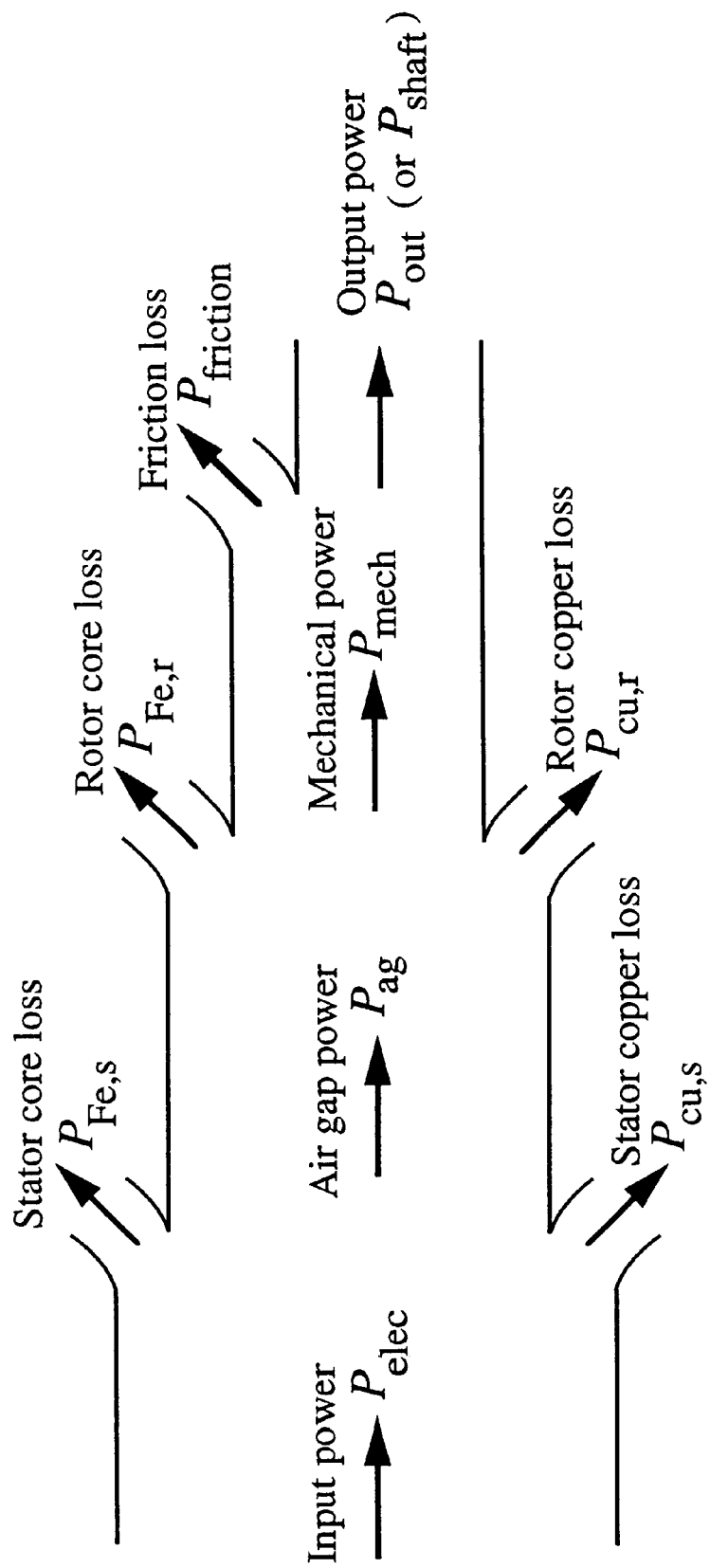
FIG. 2 illustrates the power flow in an induction machine in motoring mode.
Figure 3A:
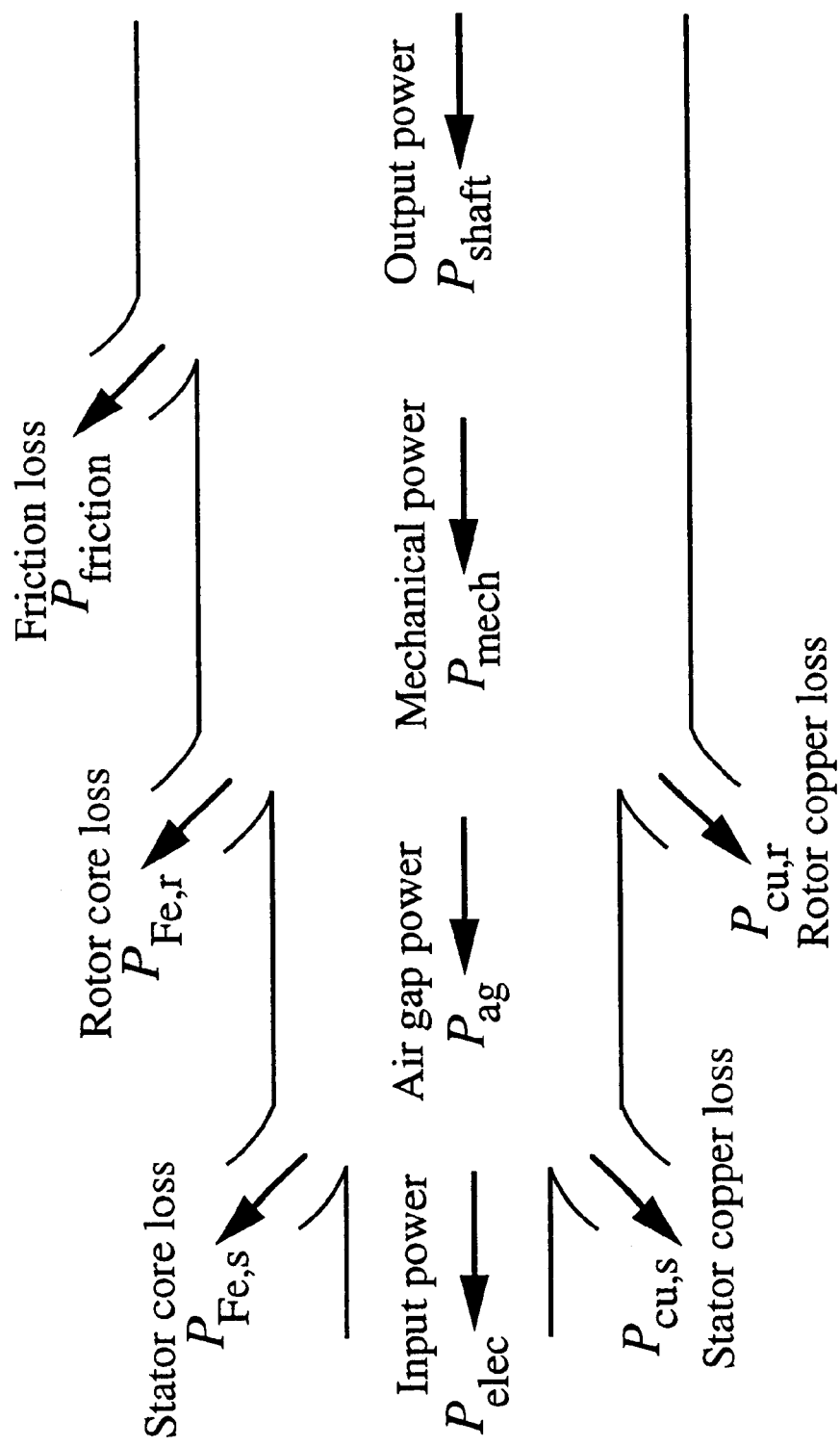
FIG. 3 illustrates the power flow in an induction machine in (a) generating mode and (b) plugging mode.
Figure 3B:
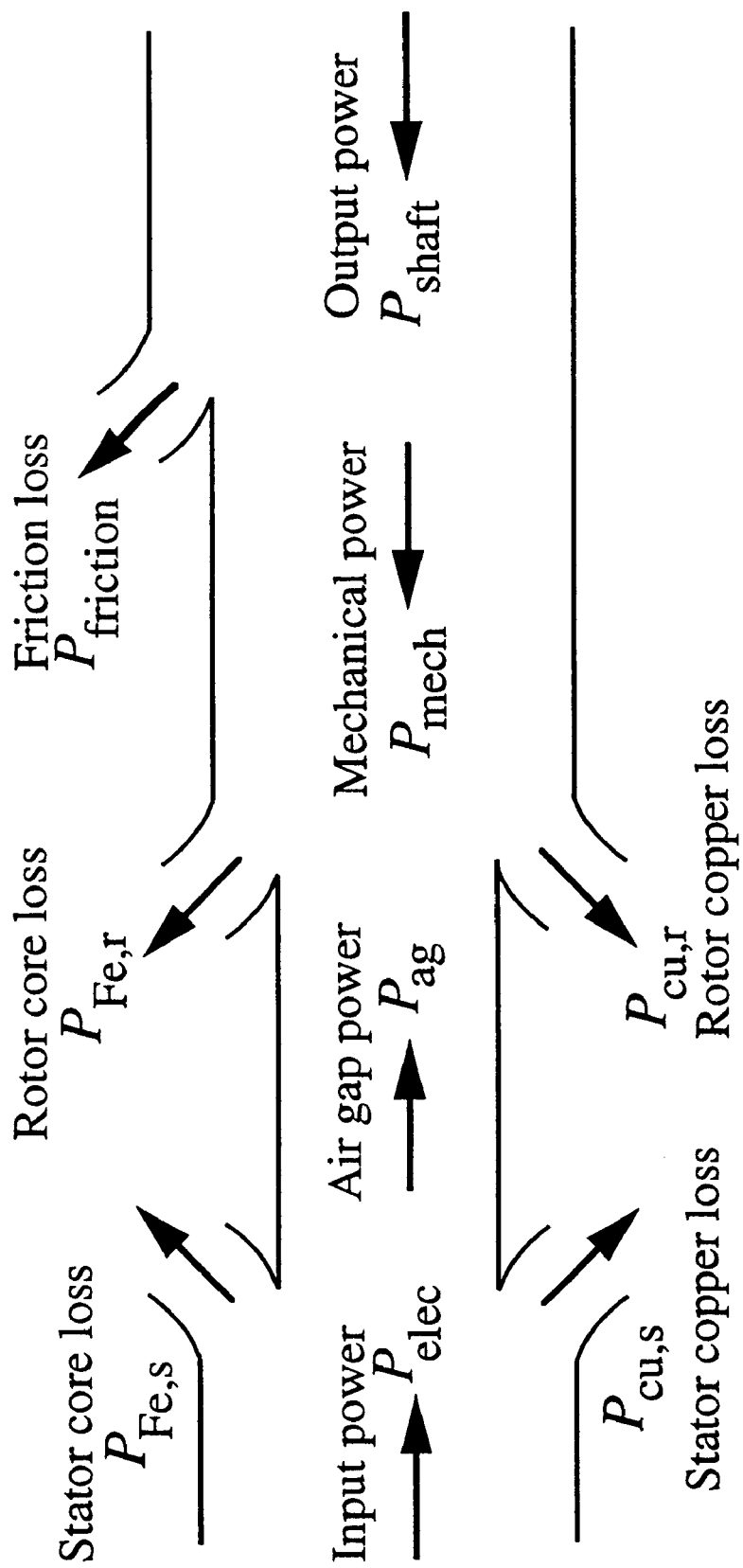
Figure 4:
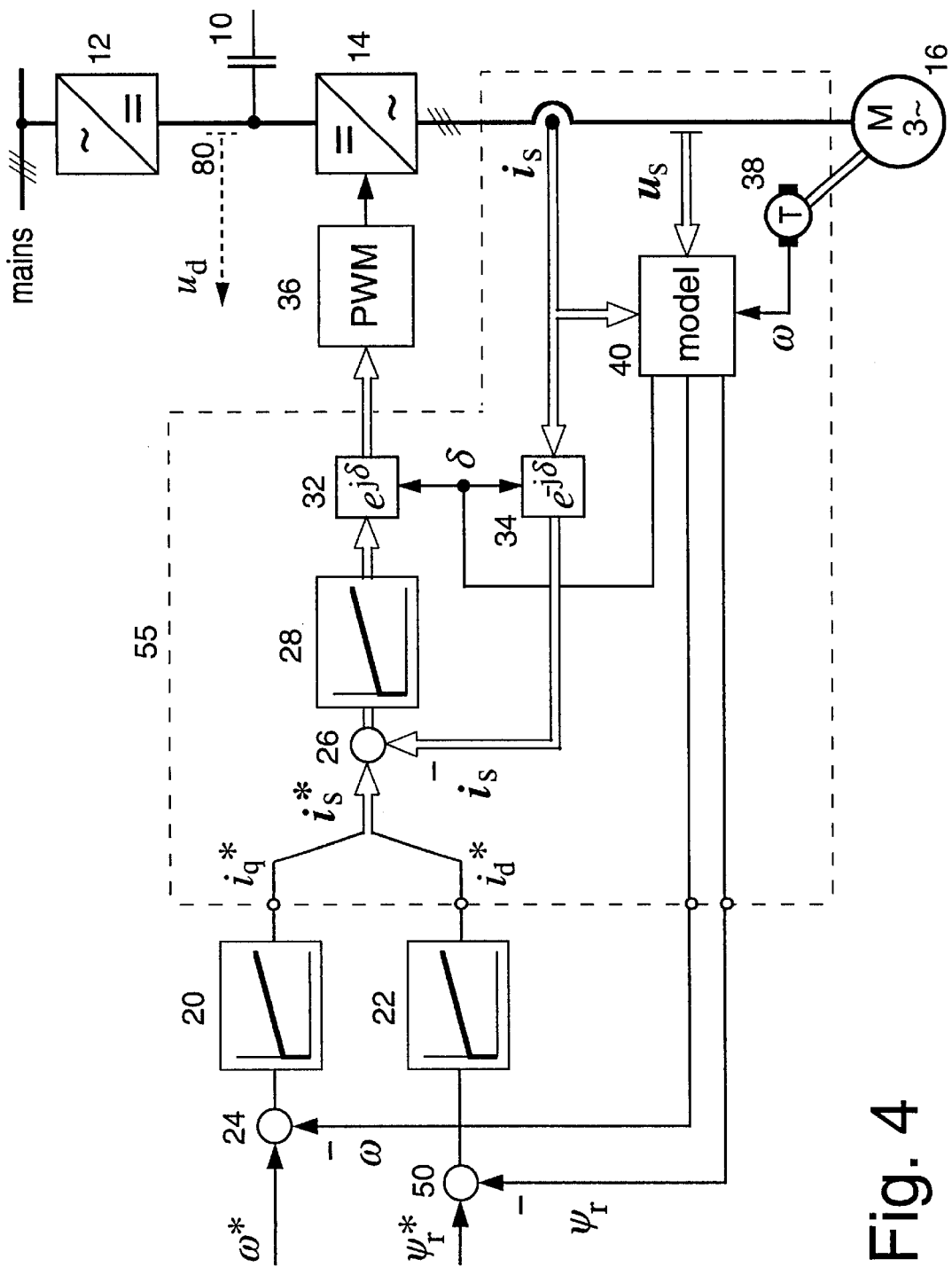
FIG. 4 is a schematic block diagram illustrating the FO control scheme.

The exemplary FO-control scheme illustrated in FIG. 4 employs a speed sensor. It is to be noted that the present invention is likewise and without change applicable to speed sensorless controls also well known in the art.

It is common to implement the functional blocks required for the FO control and illustrated in FIG. 4 by means of a program controlled microprocessor. As will be appreciated by those skilled in the art, a control device in accordance with the present invention can likewise be, and preferably is, implemented by means of such program controlled microprocessor. In fact, by providing a machine readable storage medium carrying the required program and loading that program into existing FO control drives, such existing drives easily be made to perform a control in accordance with the invention.

What is claimed is:

1. A method of braking a variable speed vector controlled induction machine driven by a pulse width modulation (PWM) inverter, wherein the q-current component and the d-current component of the stator current are controlled independently from one another in accordance with a first reference signal ($i_q^*$) and a second reference signal ($i_d^*$), respectively, wherein the method comprises steps that perform the acts of:

(a) measuring or estimating actual rotor speed ($\omega$) of the induction machine, (b) obtaining a flux value ($\Psi_r$) representing an estimation of either actual stator flux or actual rotor flux, (c) receiving a braking signal indicating a need for braking torque if the actual rotor speed ($\omega$) is higher than a reference speed ($\omega^*$), (d) superimposing, in response to the braking signal, high frequency components on said second reference signal ($i_d^*$), and (e) controlling the root-mean-square (rms) value ($i_{d\,rms}$) of said second reference signal obtained from step (d) in accordance with a difference between the absolute value of said reference speed ($\omega^*$) and that of the speed obtained in step (a), while (f) controlling the average value ($i_{d\,av}$) of said second reference signal obtained from step (d) independently from step (e) in accordance with a difference between a reference flux ($\psi_r^*$) and the flux value ($\Psi_r$) obtained in step (b).

2. The method of claim 1, wherein step (e) comprises limiting said rms value to a predetermined maximum ($i_{max}$) as determined by the current limit of the PWM inverter.

3. The method of claim 2, wherein step (d) comprises generating a square wave carrier signal of a period smaller than the rotor time constant ($\tau_r$), and steps (e) and (f) comprise modulating the pulse width and pulse amplitude of said carrier signal such that the amplitude becomes $i_{d\,rms}$ and the duty ratio d becomes $$d = \frac{1}{2}\left(1 + \frac{i_{d\,av}}{i_{d\,rms}}\right)$$

wherein $i_{d\,av}$ represents the average value and $i_{d\,rms}$ represents the rms value of the said modulated carrier signal.

4. The method of claim 1, wherein step (d) comprises generating a square wave carrier signal of a period smaller than the rotor time constant ($\tau_r$), and steps (e) and (f) comprise modulating the pulse width and pulse amplitude of said carrier signal such that the amplitude becomes $i_{d\,rms}$ and the duty ratio d becomes $$d = \frac{1}{2}\left(1 + \frac{i_{d\,av}}{i_{d\,rms}}\right)$$

wherein $i_{d\,av}$ represents the average value and $i_{d\,rms}$ represents the rms value of the said modulated carrier signal.

5. The method of any one of claims 1 through 4, further comprising:

(g) controlling said first reference signal ($i_q^*$) in such a way that the DC voltage ($u_d$) at the DC side of said PWM inverter does not exceed a predetermined maximum voltage ($u_{d\ max}$).

6. A control device for carrying out a method of braking a variable speed vector controlled induction machine, comprising:

a rectifier having an output, a direct current (DC) link capacitor coupled to the output of said rectifier, a pulse width modulation (PWM) inverter coupled between said DC link capacitor and said induction machine, a controller for said PWM inverter, said controller having a first input terminal for receiving a first reference signal ($i_q^*$) for the q-current component of the stator current, and a second input terminal for receiving a second reference signal ($i_d^*$) for the d-current component of the stator current, a terminal for receiving a first signal ($\omega$) representing actual rotor speed of the induction machine or an estimation thereof, an observer for obtaining a second signal ($\psi_r$) representing an estimation of either actual stator flux or actual rotor flux of the induction machine, a speed controller for generating said first reference signal ($i_q^*$) in response to a difference between a reference speed ($\omega^*$) and said first signal, a flux controller for generating a third reference signal ($i_{d\ av}$) in response to a difference between a reference flux ($\psi_r^*$) and said second signal ($\psi_r$), a terminal for receiving a braking signal indicating a need for braking torque if the actual rotor speed ($\omega$) is higher than a reference speed ($\omega^*$), a loss controller for generating a fourth reference signal ($i_{d\ rms}$) in response to a difference between the absolute value of said reference speed ($\omega^*$) and that of said first signal ($\omega$), and a signal generator responsive to said braking signal for generating said second reference signal ($i_d^*$) including high frequency components, and having its rms value ($i_{d\ rms}$) controlled in accordance with said fourth reference signal, and its average value ($i_{d\ av}$) independently controlled in accordance with said third reference signal.

7. The device of claim 6, wherein said signal generator comprises:

a pulse width and pulse amplitude modulator responsive to said third and fourth reference signals for generating a square wave carrier signal having a period smaller than the rotor time constant ($\tau_r$) and being pulse width modulated to have a duty ratio d of $$d = \frac{1}{2}\left(1 + \frac{i_{d\ av}}{i_{d\ rms}}\right)$$

wherein $i_{d\ av}$ represents said third reference signal and $i_{d\ rms}$ represents fourth reference signal, such that the average value of the pulse width modulated carrier signal corresponds to said third reference signal and its rms value to said fourth reference signal, and a switch responsive to said reference speed ($\omega^*$) and said first signal ($\omega$) for providing, as said second reference signal ($i_d^*$), either said modulated carrier signal or said third reference signal ($i_{d\ av}$), said modulated carrier signal being provided when the absolute value of said reference speed ($\omega^*$) is lower than that of said first signal ($\omega$), while, otherwise, said third reference signal ($i_{d\ av}$) is provided.

8. The device of claim 7, further comprising a first limiter for limiting the magnitude of said fourth reference signal to a predetermined maximum ($i_{max}$) as determined by the current limit of the PWM inverter.

9. The device of claim 8, further comprising:

a second limiter for limiting said first reference signal ($i_q^*$) output from said speed controller to a positive and a negative limit value, said second limiter being responsive to a control signal for adjusting said negative limit value in accordance with said control signal, and a voltage controller receiving a reference voltage ($u_{d\ max}$) representing the maximum allowable value of the DC link voltage across said DC link capacitor and the actual value ($u_d$) of the DC link voltage, and generating said control signal such that negative values said first reference signal are limited by said second limiter such that the actual value of the DC link voltage ($u_d$) never exceeds said reference voltage ($u_{d\ max}$).

10. The device of claim 9, further comprising a third limiter for limiting said control signal to a predetermined maximum ($i_{q\ max}$).

11. The device of claim 7, further comprising:

a second limiter for limiting said first reference signal ($i_q^*$) output from said speed controller to a positive and a negative limit value, said second limiter being responsive to a control signal for adjusting said negative limit value in accordance with said control signal, and a voltage controller receiving a reference voltage ($u_{d\ max}$) representing the maximum allowable value of the DC link voltage across said DC link capacitor and the actual value ($u_d$) of the DC link voltage, and generating said control signal such that negative values said first reference signal are limited by said second limiter such that the actual value of the DC link voltage ($u_d$) never exceeds said reference voltage ($u_{d\ max}$).

12. The device of claim 11, further comprising a third limiter for limiting said control signal to a predetermined maximum ($i_{q\ max}$).

13. The device of any one claims 7 through 12, wherein said pulse width modulator comprises:

an oscillator for generating a triangular signal ($u_A$) of said predetermined frequency, a first multiplier for multiplying said triangular signal with said fourth reference signal ($i_{d\ rms}$) thereby generating a modulated triangular signal, a first adder for adding said third reference signal to the output signal of said first multiplier, a comparator receiving the output signal of said first adder and outputting a positive signal of unity magnitude in response to a positive input signal, and a negative signal of unity magnitude in response to a negative input signal, and a second multiplier for multiplying the output signal from said comparator with said fourth reference signal.

14. The device of claim 13, wherein said switch comprises:

a first limiter receiving said fourth reference signal and having a transfer function y=f(x), $y = 0$ for $x > 0$, $y = -x$ for $0 \geq x > x_{max}$ $y = x_{max}$ for $x \leq x_{max}$, wherein $x_{max}$ represents a predetermined maximum ($i_{max}$) of said fourth reference signal as determined by the current limit of the PWM inverter, said first multiplier multiplying the output signal of said first limiter with said triangular signal ($u_A$), a second adder for obtaining the difference between the output signal of said first limiter and said third reference signal ($i_{d\ av}$), a fourth limiter receiving the output signal from said second adder, said fourth limiter having a transfer function $y=f(x)$ $y=0$ for $x<0$ $y=x$, otherwise, and a third adder for adding said third reference signal ($i_{d\ av}$) to the output signal of the third limiter, the output signal of the third adder being applied to said second multiplier to be multiplied with the output signal of said comparator.

15. The device of claim 14, wherein said speed controller, flux controller, loss controller, voltage controller, pulse width and pulse amplitude modulator, and switch are implemented by a program controlled microprocessor.

16. The device of claim 13, wherein said speed controller, flux controller, loss controller, voltage controller, pulse width and pulse amplitude modulator, and switch are implemented by a program controlled microprocessor.

17. The device of claims 7 or 8, wherein said speed controller, flux controller, loss controller, pulse width and pulse amplitude modulator, and switch are implemented by a program controlled microprocessor.

18. The device of any one of claims 9, 10, 11, or 12, wherein said speed controller, flux controller, loss controller, voltage controller, pulse width and pulse amplitude modulator, and switch are implemented by a program controlled microprocessor.

19. A machine readable medium carrying a program of instructions for execution by a device to perform a method for braking a variable speed vector controlled induction machine driven by a pulse width modulation (PWM) inverter, wherein the q-current component and the d-current component of the stator current are controlled independently from one another in accordance with a first reference signal ($i_q^*$) and a second reference signal ($i_d^*$), respectively, wherein the method comprises steps that perform the acts of:

(a) measuring or estimating actual rotor speed ($\omega$) of the induction machine, (b) obtaining a flux value ($\Psi_r$) representing an estimation of either actual stator flux or actual rotor flux, (c) receiving a braking signal indicating a need for braking torque if the actual rotor speed ($\omega$) is higher than a reference speed ($\omega^*$), (d) superimposing, in response to the braking signal, high frequency components on said second reference signal ($i_d^*$), and (e) controlling the root-mean-square (rms) value ($i_{d\ rms}$) of said second reference signal obtained from step (d) in accordance with a difference between the absolute value of said reference speed ($\omega^*$) and that of the speed obtained in step (a), while (f) controlling the average value ($i_{d\ av}$) of said second reference signal obtained from step (d) independently from step (e) in accordance with a difference between a reference flux ($\psi_r^*$) and the flux value ($\Psi_r$) obtained in step (b).

20. The machine readable medium of claim 19, wherein step (e) comprises limiting said rms value to a predetermined maximum ($i_{max}$) as determined by the current limit of the PWM inverter.

21. The machine readable medium of claim 20, wherein step (d) comprises generating a square wave carrier signal of a period smaller than the rotor time constant ($\tau_r$), and steps (e) and (f) comprise modulating the pulse width and pulse amplitude of said carrier signal such that the amplitude becomes $i_{d\ rms}$ and the duty ratio d becomes $$d = \frac{1}{2}\left(1 + \frac{i_{d\,av}}{i_{d\,rms}}\right)$$

wherein $i_{d\ av}$ represents the average value and $i_{d\ rms}$ represents the rms value of the said modulated carrier signal.

22. The machine readable medium of claim 19, wherein step (d) comprises generating a square wave carrier signal of a period smaller than the rotor time constant ($\tau_r$), and steps (e) and (f) comprise modulating the pulse width and pulse amplitude of said carrier signal such that the amplitude becomes $i_{d\ rms}$ and the duty ratio d becomes $$d = \frac{1}{2}\left(1 + \frac{i_{d\,av}}{i_{d\,rms}}\right)$$

wherein $i_{av}$ represents the average value and $i_{d\ rms}$ represents the rms value of the said modulated carrier signal.

23. The machine readable medium of any one of claims 19 through 22, wherein the method further comprises:

(g) controlling said first reference signal ($i_q^*$) in such a way that the DC voltage ($u_d$) at the DC side of said PWM inverter does not exceed a predetermined maximum voltage ($u_{d\ max}$).

* * * * *